US012752459B2

(12) United States Patent
Holcombe et al.

(10) Patent No.: US 12,752,459 B2
(45) Date of Patent: Oct. 6, 2026

(54) CALIBRATED CONCRETE MOISTURE CONTROL SYSTEM

(71) Applicant: Holcombe CVI, LLC, Ault, CO (US)

(72) Inventors: Brent A. Holcombe, Severance, CO (US); James K. Brewster, Eaton, CO (US)

(73) Assignee: Holcombe CVI, LLC, Ault, CO (US)

( * ) Notice: Subject to any disclaimer, the term of this patent is extended or adjusted under 35 U.S.C. 154(b) by 743 days.

(21) Appl. No.: 18/095,067

(22) Filed: Jan. 10, 2023

(65) Prior Publication Data

US 2023/0226720 A1 Jul. 20, 2023

Related U.S. Application Data

(60) Provisional application No. 63/299,734, filed on Jan. 14, 2022.

(51) Int. Cl.
*B28C 7/04* (2006.01)
*B28C 7/06* (2006.01)
*B28C 7/12* (2006.01)

(52) U.S. Cl.
CPC .......... *B28C 7/0418* (2013.01); *B28C 7/0481* (2013.01); *B28C 7/06* (2013.01); *B28C 7/126* (2013.01)

(58) Field of Classification Search
CPC ....... B28C 7/0418; B28C 7/0481; B28C 7/06; B28C 7/126; B28C 9/0463
See application file for complete search history.

(56) References Cited

U.S. PATENT DOCUMENTS

| | | | |
|---|---|---|---|
| 675,037 | A | 5/1901 | Drake |
| 3,451,659 | A | 6/1969 | Tobolov et al. |
| 3,456,925 | A | 7/1969 | Gallagher |
| 3,917,236 | A | 11/1975 | Hanson |
| 4,023,779 | A | 5/1977 | Beloy |
| 5,121,989 | A | 6/1992 | Horton |
| 5,823,629 | A | 10/1998 | Smith et al. |
| 6,082,748 | A | 7/2000 | Hartmann et al. |
| 6,247,712 | B1 | 6/2001 | Smith et al. |
| 6,293,689 | B1 | 9/2001 | Guntert, Jr |
| 9,616,592 | B1 | 4/2017 | Holcombe et al. |

(Continued)

FOREIGN PATENT DOCUMENTS

| | | |
|---|---|---|
| CA | 2605046 | 10/2006 |
| EP | 3216631 A1 | 9/2017 |

(Continued)

OTHER PUBLICATIONS

U.S. Appl. No. 63/251,983, filed Oct. 4, 2021, Holcombe.

(Continued)

*Primary Examiner* — Mark A Connolly
*Assistant Examiner* — Michael V Farina
(74) *Attorney, Agent, or Firm* — Craig R. Miles; CR MILES P.C.

(57) ABSTRACT

Embodiments of the invention generally relate to a concrete moisture control system including a controller operable to control a water pump and a proportional control valve to adjust the flow rate of water delivered to the amounts of materials dispensed per unit time from each of a plurality of material holding bins to control the moisture in the production of concrete.

8 Claims, 3 Drawing Sheets

(56) References Cited

U.S. PATENT DOCUMENTS

| | | | | |
|---|---|---|---|---|
| 9,809,074 | B2 | 11/2017 | Strong et al. | |
| 10,472,176 | B2 | 11/2019 | Holcombe et al. | |
| 11,827,072 | B2 | 11/2023 | Holcombe | |
| 12,172,488 | B2 | 12/2024 | Holcombe | |
| 2002/0034120 | A1 | 3/2002 | Guntert et al. | |
| 2004/0056441 | A1 | 3/2004 | Chalin | |
| 2005/0219942 | A1 | 10/2005 | Wallgren | |
| 2007/0014185 | A1* | 1/2007 | Diosse | B01F 35/83 366/9 |
| 2010/0238758 | A1 | 9/2010 | Jones | |
| 2013/0199617 | A1* | 8/2013 | Degaray | B28C 7/0038 137/1 |
| 2014/0210174 | A1 | 7/2014 | Conaway et al. | |
| 2014/0232080 | A1 | 8/2014 | Karel et al. | |
| 2014/0355372 | A1* | 12/2014 | Black | B01F 35/881 366/8 |
| 2015/0103614 | A1* | 4/2015 | Brock | B01F 35/71775 366/3 |
| 2015/0233184 | A1* | 8/2015 | Pettay | F04D 15/0066 239/11 |
| 2020/0156427 | A1 | 5/2020 | Schutt | |
| 2020/0223097 | A1* | 7/2020 | Koppelaar | G05D 1/0285 |
| 2020/0256713 | A1* | 8/2020 | Kabrich | G01F 1/40 |
| 2020/0276731 | A1* | 9/2020 | Igo | B28C 7/02 |
| 2023/0109453 | A1 | 4/2023 | Holcombe | |

FOREIGN PATENT DOCUMENTS

| | | |
|---|---|---|
| WO | WO 2006/113670 | 10/2006 |
| WO | WO 2011/146163 | 11/2011 |

OTHER PUBLICATIONS

U.S. Appl. No. 63/299,734, filed Jan. 14, 2022.
U.S. Appl. No. 13/868,404, Office Action mailed Jun. 2, 2016.
U.S. Appl. No. 15/469,509, Office Action mailed May 30, 2017.
U.S. Appl. No. 15/469,509, Office Action mailed Nov. 22, 2017.
U.S. Appl. No. 15/469,509, Office Action mailed May 15, 2018.
U.S. Appl. No. 15/469,509, Office Action mailed Oct. 15, 2018.
U.S. Appl. No. 15/469,509, Office Action mailed Feb. 5, 2019.
U.S. Appl. No. 18/379,009, Office Action mailed Apr. 23, 2024.

* cited by examiner

CALIBRATED CONCRETE MOISTURE CONTROL SYSTEM

I. FIELD OF THE INVENTION

Embodiments of the invention generally relate to apparatus and methods to control the addition of moisture to materials for the production of concrete.

II. BACKGROUND

Concrete is composed of four main ingredients: cement, coarse aggregate, fine aggregate and water (also referred to as "materials"). The materials are admixed to produce concrete. The types and proportions of the four main ingredients can vary to produce different types of concrete. Slump is the measure of concrete consistency and fluidity. The greater the slump, the wetter the mixture. Slump is measured by placing fresh concrete in a slump cone in tamped layers. Once the slump cone is filled with concrete and leveled with the top of the slump cone, the slump cone is lifted upwards and away from the concrete. The concrete is then allowed to subside and the difference in height of the subsided concrete to the original height of the concrete cone is the measure of slump in inches (millimeters). Average slump for ordinary decorative concrete applications is about 4 inches to about 5 inches (about 100 mm to about 130 mm). While the slump may vary based on the application, above average slump can cause reduced strength, durability, and permeability of the concrete.

Concrete mixing systems can include a plurality of material holding bins for storing materials to be mixed together to form concrete. Generally, a transport mechanism transports materials dispensed from the each of the plurality of material holding bins to an area at which the materials can be brought together and admixed with an amount of water to produce a batch of concrete. However, in conventional volumetric concrete mixing systems inconsistency in slump can occur within a batch of concrete and between batches of concrete. This may can be especially true when a volumetric mixing system starts and stops in production between batches of concrete of the same or different types of concrete or stops and starts to divide production of concrete into a plurality of small volumes, such as wheelbarrow volumes. The inconsistency in slump can be due to wear and tear on the components of the concrete mixing system, varying proportions of materials admixed, variation in the moisture contained in the materials held in the storage bins, variation in the amount of moisture delivered over time to the admixed materials, or a change in production rate, and combinations thereof. There would be a substantial advantage in a moisture control system configured to control the amount of moisture in the production of concrete to maintain consistency of slump within or between batches of concrete.

II. A BRIEF DESCRIPTION OF THE DRAWINGS

III. DETAILED DESCRIPTION OF THE PREFERRED EMBODIMENTS

Figure 1A:
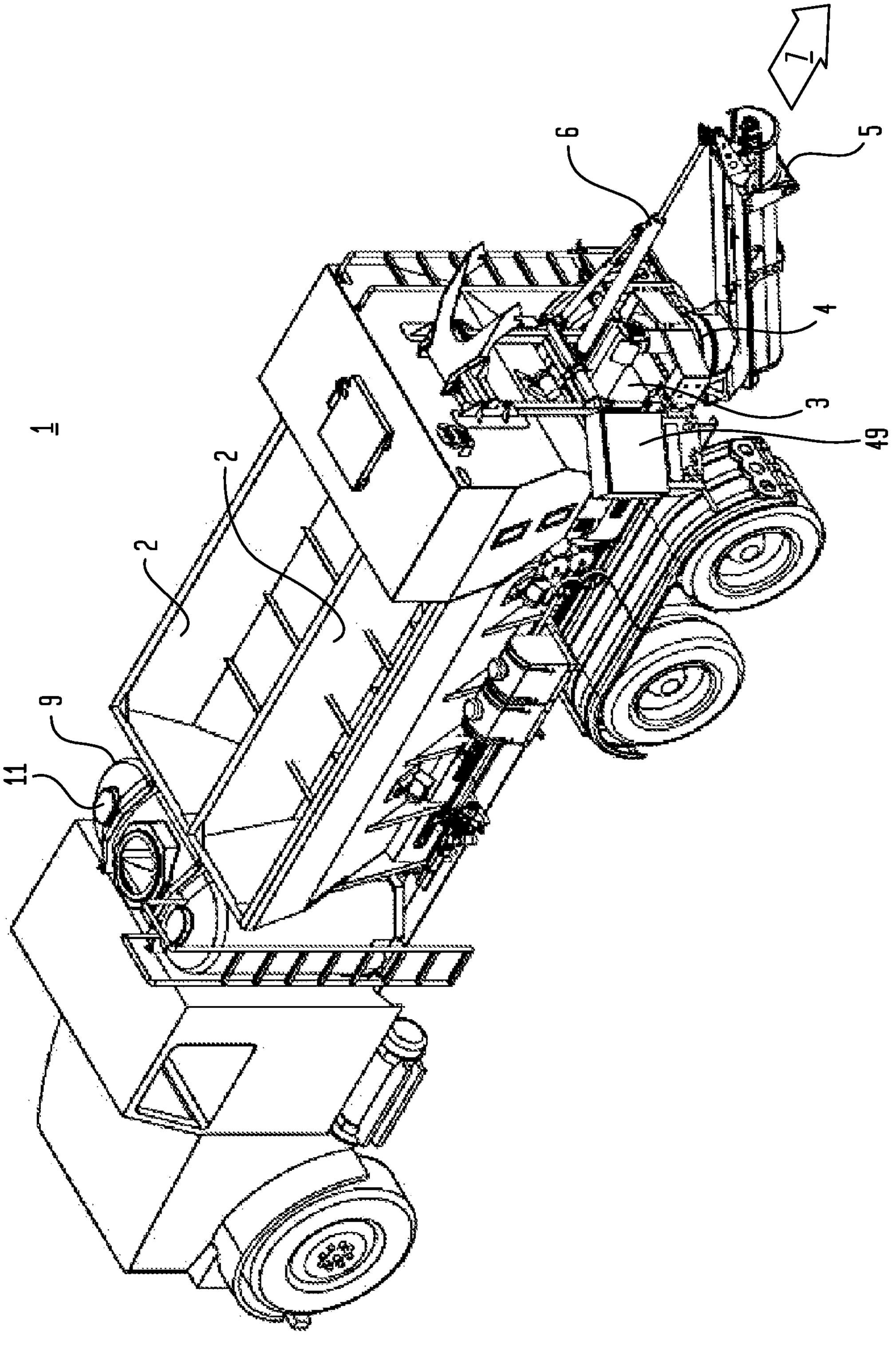
FIG. 1A depicts a particular embodiment of materials mixing system.
Figure 1B:
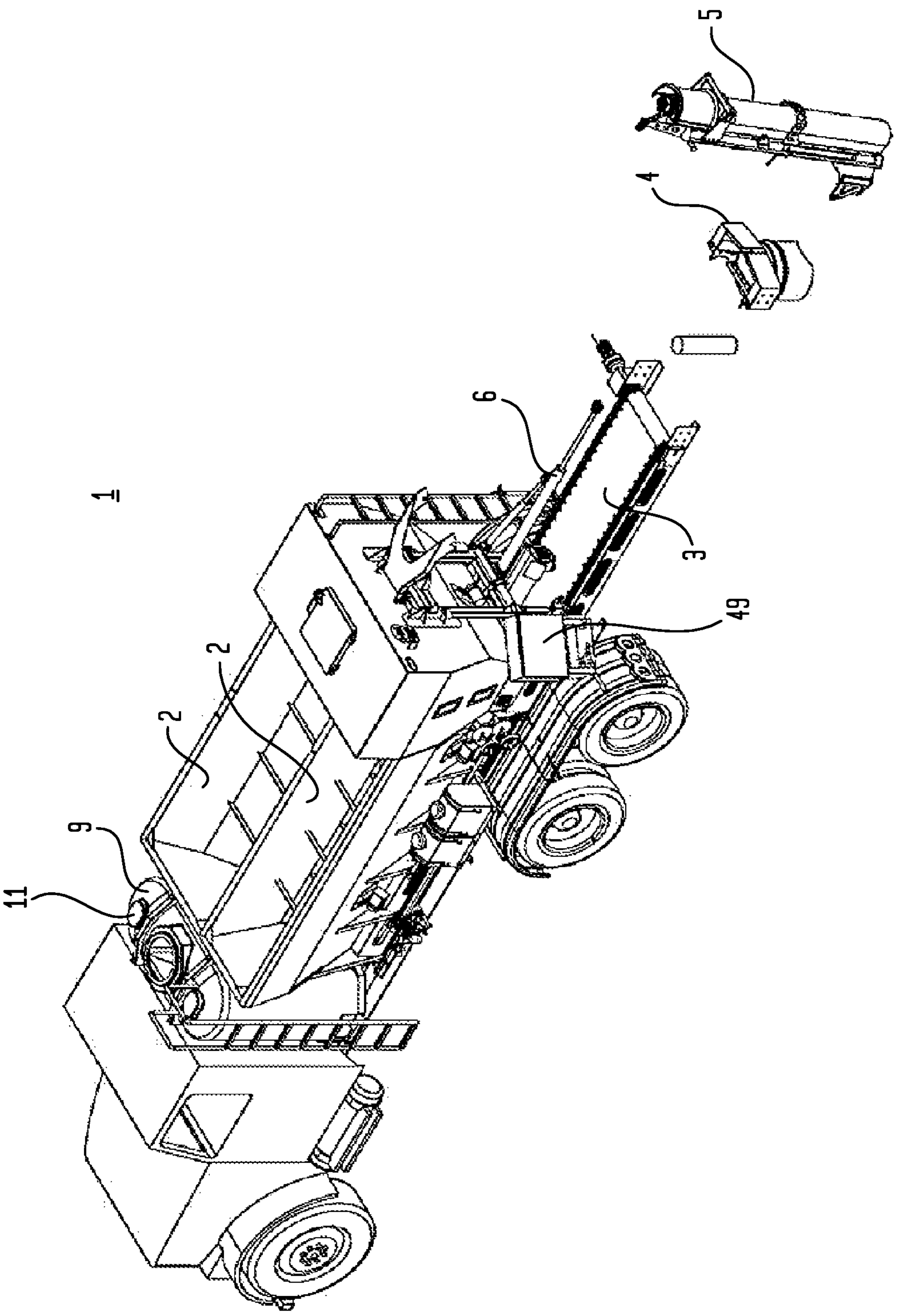
FIG. 1B shows the particular embodiment of the materials mixing system shown in FIG. 1A, with the material conveyor shown partially removed from the materials mixing system.
Figure 2:
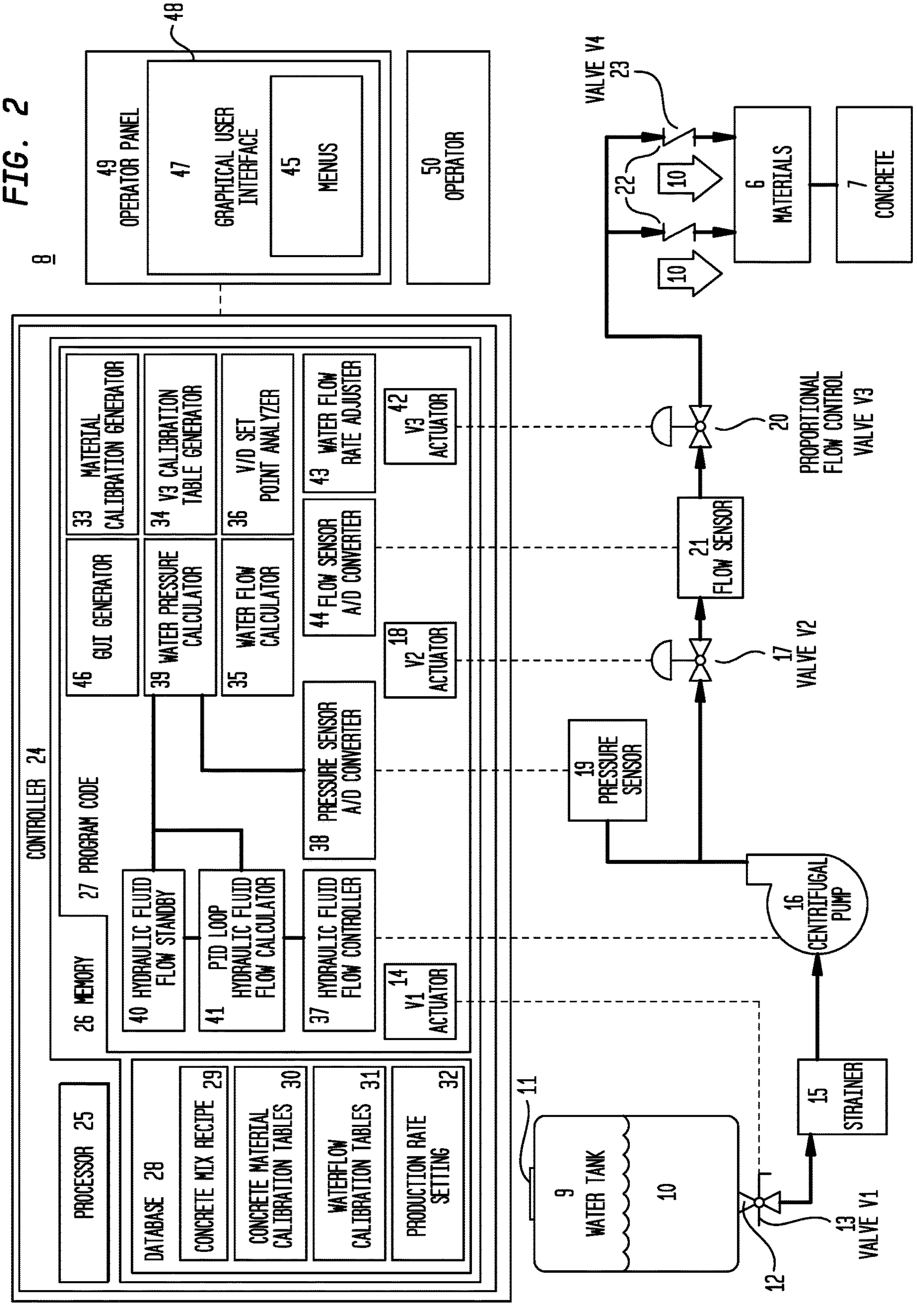
FIG. 2 is block flow diagram illustrating an embodiment of a calibrated concrete moisture control apparatus and an embodiment of a method of using a calibrated concrete moisture control apparatus to control the amount of moisture in production of concrete.

Now, with general reference to FIGS. 1A and 1B and 2, the present system can comprise a materials mixing system (1) comprising a plurality of material holding bins (2), a material conveyor (3), a materials mixer (4), a materials dispenser (5), a materials dispenser position controller (6). In particular embodiments, the materials dispenser (5) can comprise a chute configured to deliver the mixed materials (6) as concrete (7), and the materials dispenser position controller (6) can comprise an extendable and retractable member to lower and raise the end of the chute.

Now, with primary reference to FIG. 1B, the material conveyor (3) can comprise a frame supporting a cycling belt. In particular embodiments, the material conveyor (3) can, but need not necessarily, be modular so that it may be removed almost substantially in its entirety from the materials mixing system (1) without the need to disassemble the material conveyor (3). In one embodiment, access to the material conveyor (3) can be at one end of the materials mixing system (1) and can be removed in modular format by removing one or more of: the materials mixer (4), the materials dispenser (5) and associated materials dispenser position controller (6).

Now, with primary reference to FIG. 2, which depicts a block flow diagram of a moisture control apparatus (8) and methods of using a concrete moisture control apparatus (8) to control the amount of moisture in concrete (7) produced by operation of a materials mixing system (1) depicted in the examples of FIGS. 1A and 1B. In particular embodiments, the system (1) can include the concrete moisture control apparatus (8), and in particular embodiments the system (1) can be retrofit with the concrete moisture control apparatus (8). The components of the moisture control apparatus (8) can include one or more water tanks (9) configured to hold water (10). For purposes of this invention the term "water" means water or water including additives having a quality suitable for use in the production of concrete (7). A water tank (9) suitable for use with embodiments of the invention can be configured to hold between 500 and 600 gallons of water (10); however, this is not intended to preclude the use of a water tank (9), or a plurality of water tanks (9), configured separately or collectively to hold a greater or lesser amount of water (10). The water tank (9) can have a water tank inlet (11) and a water tank outlet (12). A valve V1 (13) can be coupled to the water tank outlet (12) and operated between a valve closed condition and a valve open condition to control water flow from the water tank (9). In particular embodiments, valve V1 (13) can comprise a manually operated valve or can comprise a power operated valve actuated by a valve V1 actuator (14). As an illustrative example, the valve V1 (13) can comprise a manually operated one-inch ball valve or similar or equivalent valve. In particular embodiments, the water flow from the water tank (9) can pass through a strainer (15) configured to filter particulates from the water (10). As an illustrative example, the strainer (15) can comprise a McMaster-Carr, Strainer, Part No. 98775K591, or similar or equivalent strainer. The water (10) delivered from the water tank (9) can be delivered to a water pump (16). In particular embodiments, the water pump (16) can comprise a hydraulic motor driven centrifugal pump. As an illustrative example, the water pump (16)

can comprise an Ace Pump Corporation, Hydraulic Driven Centrifugal Pump, Part No. FMC-150-HYD-206, or similar or equivalent water pump. The hydraulic input flow to the hydraulic motor can be controlled to corresponding control the water flow rate delivered from the water pump (16). A valve V2 (17) can be fluidically coupled to the water pump (16) and operated between a valve closed condition and a valve open condition by operation of a valve V2 actuator (18) to control the water flow from the water pump (16). In particular embodiments, valve V2 (17) can comprise a gate valve with a seat valve driven by a pneumatic piston. As an illustrative example, the valve V2 (17) can comprise a Parker Hannifin Corporation, Angled Seat Valve, Part Number PA25SAN6S063A, or similar or equivalent valve. In particular embodiments, a pressure sensor (19) can be fluidically coupled to the water pump (16) to generate a signal which varies based on the water pressure generated in the conduit which connects the water pump (16) to valve V2 (17). As an illustrative example, the pressure sensor (19) can comprise a pressure transmitter capable of generating a variable signal that corresponds to the range of water pressure occurring in the range of 0.00 bar to about 206.00 bar (0.00 psi to about 3000 psi). A valve V3 (20) can be fluidically coupled to valve V2 (17). Valve V3 (20) can comprise proportional control valve configured to regulate the water flow from valve V2 (17) by varying the size of the flow passage via a valve V3 restrictor. As an illustrative example, valve V3 (20) can comprise a gate valve with a pneumatic proportional control actuator such as an IMI Buschjost, Part Number 8453400 with proportional actuator Part Number 1269966, or similar or equivalent valve and actuator. In particular embodiments, the moisture control apparatus (8) can further include a water flow sensor (21) fluidically coupled between valve V2 (17) and valve V3 (20). The water flow sensor (21) can generate a signal that varies based on the velocity of the water flow in the conduit between valve V2 (17) and valve V3 (20). As an illustrative example, a water flow sensor (21) suitable for use in embodiments of the invention can be a Sika-USA, Inc., model VMZ.2 having Part Number VMZ25, or similar or equivalent water flow sensor or flow meter. In particular embodiments, the conduit extending from valve V3 (20) can terminate at one or more conduit outlets (22) at which the water (10) can be admixed with materials (6) dispensed from the plurality of material holding bins (2) to produce concrete (7). Each of the one or more conduit outlets (22) can be regulated by a valve V4 (23) which operates to maintain water in the conduit when the moisture control apparatus (8) is not operating to deliver water through the one or more conduit outlets (22). A valve V4 (23) suitable for use with embodiments of the invention can be a check valve. As an illustrative example, a check valve suitable for use with embodiments of the invention can be a Campbell Manufacturing, Check Valve, Model CV-4TLF, or similar or equivalent valve.

Again, with primary reference to FIG. 2, embodiments of the moisture control apparatus (8) can further include a controller (24) including a processor (25) communicatively coupled to a non-transitory computer readable medium (26) (also referred to as a "memory") containing a concrete moisture control program code (27) (also referred to as the "program code"), which operates to retrieve data from one or more databases (28) and operate the components of the moisture control apparatus (8) to regulate the amount of water (10) admixed with materials (6) to form concrete (7). The controller (24) may be described in the general context of a processor (25) in communication with a non-transitory computer readable medium (26) which contains a program code (27) or computer-executable instructions, such as an application program and program modules which utilize routines, programs, objects, components, data structures, or the like, to perform particular functions or tasks or implement particular abstract data types, or the like, it is not intended that embodiments of the invention be limited to a particular computer code, set of computer-executable instructions or protocols.

While illustrative examples in this description dispose the program code (27) in one memory (26) within one controller (24) for clarity, it is to be understood that various types of data may reside in one memory (26) or one controller (24) or can be distributed among a plurality of memories (27), controllers (24) or other computer devices which can stand alone or be associated in a local area network ("LAN") or wide area network ("WAN") such as the Internet, and embodiments of the invention can utilize controllers or computers to a lesser or greater extent depending upon the application.

The database (28) which can be contained in memory (26) or in remote database accessible in the LAN or WAN can be contain data relating to one or more of: concrete mix recipes (29), concrete material calibration tables (30), water flow calibration tables (31), production rate table (32). In regard to concrete mix recipes (29), the database (28) can contain one or a plurality of concrete mix recipes (29) which can be retrieved from the database (28) by operation of the program code (27). Concrete mix design can be complex, the design of a concrete mix recipe (29) depends on the project both in terms of strength and appearance and in relation to local statues, rules and codes. Many factors need to be taken into account, including as illustrative examples: the cost of the various materials, tradeoffs between the "slump" for easy mixing and placement, performance, and the method of mixing. The concrete mix recipe (29) can be developed in view of these factors and sets out the relative proportion of each of the materials (6) to be admixed, for example, the relative proportion of cement, water, sand, and gravel. The concrete mix recipe (29) can be recorded in the database (28).

Now, with primary reference to FIG. 1A and FIG. 2, in regard to the concrete material calibration tables (30), the database (29) can contain one or a plurality of concrete material calibration tables (30), which can be retrieved by operation of the program code (27). To achieve the relative proportions of the materials (6) dispensed by each of a plurality of material holding bins (2), the gates associated with each of the plurality of holding bins (2) can be calibrated to standardize the materials (6) delivered per unit time from each of the plurality of holding bins (2). For each of the plurality of holding bins (2), based on the type of material(s) (6) fed from each of the plurality of bins (2), one or more concrete material calibration tables (30) can be generated and recorded in the database (28). As an illustrative example, for cement, sand or gravel the calibration can be performed by cleaning the cement, sand or aggregate holding bin (2) from which the cement, sand or gravel is to be fed. Determine the percentage moisture in the cement, sand or gravel to be fed. Load the cement, sand or gravel in the corresponding holding bin (2). For each holding bin (2), select two or more gate opening settings within the gate opening range of the holding bin (2). Set the material mixing system (1) to run at the proper operating speed. Prime the entire length of the material conveyor (3) with the gate opening at the highest selected setting. Subsequently, make two or more calibration runs at each of the selected gate opening settings. Capture the materials (6) fed from the material holding bin (2) into an empty container over a number of counts. Record each of: the weight of the collection container and collected material (6), weight of empty container, weight of material (6), weight of moisture in the material, weight of free water, exact counts on register, average weight per count, time elapsed over counts on register (individually and collectively "recorded calibration data"). The program code (27) can in part include a concrete material calibration generator (33) which functions, based on the recorded calibration data, to generate the concrete material calibration table (30) for each of the plurality of material holding bins (2).

Now, with primary reference to FIG. 2, in regard to water flow calibration table (31), the database (28) can contain one or a plurality of water flow calibration tables (31), each of which can be retrieved by operation of the program code (27). The water flow calibration table (31) relates proportional valve V3 (20) valve position to water flow rate (gallons per minute or other units of volume over unit time) through valve V3 (20). The proportional valve V3 (20) can be set individually to a series of valve V3 (20) position set points from a fully closed position to a fully open position and a water flow rate can then be recorded at each set point. In particular embodiments, the centrifugal pump (16) can operate in standby condition in which valve V2 (17) remains closed and valve V3 (20) remains closed. The standby pressure between the water pump (16) and valve V2 (17) can assessed by operation of the pressure sensor (19) and maintained consistent between measurements of water flowrate at each valve V3 (20) position set point. The standby pressure allows water (10) to flow as instantaneously as possible when valve V2 (17) and valve V3 (20) open. Valve V3 (20) is then set at the first valve V3 (20) position set point. Then valve V2 (17) is opened. The water flow sensor (21) senses the water flow between valve V2 (17) and valve V3 (20). When the water flow reads at a consistent flow value through valve V3 (20), the water flow value is recorded for the valve V3 (20) first position set point. This stepwise process can be repeated for each of the additional valve V3 (20) position set points until each of the valve V3 (20) position set points have a recorded water flow value. This results in recorded stepped points of water flow rate against each valve V3 (20) position set point. The recorded position step points can be connected to plot valve V3 (20) valve position against water flow rate. This allows preselection of a water flowrate and corresponding valve V3 (20) position even without a linear relationship between valve V3 (20) valve position and water flowrate through valve V3 (20). In particular embodiments, the program code (27) can further include a water flow rate calibration table generator (34) which functions based on water flow values recorded at each proportional valve V3 (20) set point during proportional valve V3 calibration to generate a water flow rate calibration table (31).

Now, with primary reference to FIGS. 1A and 2, in regard to the production rate settings (32), the database (28) can contain one or a plurality of production rate settings (32), each of which can be retrieved by operation of the program code (27). The production rate setting (32) can vary depending on the selected concrete mix recipe (20) and the type of materials mixing system (1). As an illustrative example, at maximum speed a volumetric concrete mixer with a 24" wide conveyor belt and 12" mixing auger can produce concrete (7) at a rate of 40 $m^3$ (52 $yd^3$) to 60 $m^3$ (78 $yd^3$) per hour. The production rate setting (32) selected correspondingly relates to the amount of materials (6) fed from the holding bins (2) and the water flow rate through valve V3 (20).

The water flow calibration table (31) for a particular proportional valve V3 (20) along with a particular one of the concrete mix recipes (29) and the production rate setting (32) can be concurrently retrieved from the database (28) by operation of the program code (27). The program code (27) can further include a water flow calculator (35) which functions based on the retrieved concrete mix recipe (29) and the retrieved production rate setting (32) to calculate the water (10) to add to the materials (6) dispensed by the material holding bins (2) during the production of a batch of concrete (7). As an illustrative example, the water flow calculator (35) can calculate the water per cubic yard of concrete (7) based on the retrieved concrete mix recipe (29), subtract out the water attributable to the material moisture, subtract out the water added to dilute any additives, and calculate target water flowrate through valve V3 (20) based on the retrieved production setting (32). This further allows the water flowrate target to change as production rate increases or decreases during production of a batch of concrete (7) or between production of batches of concrete (7). The program code (27) can further include a valve V3 position analyzer (36) that functions based on the calculation of the water flowrate by the waterflow calculator (35) and the water flow calibration table (31) to assess the proportional valve V3 (20) set point for the production of concrete (7).

Again, with primary reference to FIG. 2, in particular embodiments, the program code (27) can further include a hydraulic fluid flow controller (37) which regulates the hydraulic fluid flow rate to the water pump (16) which in turn regulates the speed of the water pump (16) and correspondingly the water pressure at the pressure sensor (19). The program code (27) can further include a pressure sensor analog to digital converter (38) which converts the analog signal from the pressure sensor (19) to a digital signal which can be processed by a water pressure calculator (39) which functions to calculate the fluid pressure generated by the water pump (19) (pounds per square inch (psi) or other units of pressure). The program code (27) can further include a hydraulic fluid flow standby pressure regulator (40) which maintains the standby pressure between the water pump (16) and valve V2 (17). In particular embodiments, the program code (27) can further include a proportional-integral-derivative ("1") hydraulic fluid flow calculator (41) which operates as a PID loop employing feedback from the fluid pressure calculator (39) to precisely control the hydraulic fluid flow controller (37) to adjust the speed of the water pump (16) to adjust water flow rate. The water flow rate can be sensed by the water flow sensor (21) which generates a signal that varies based on sensed water flow rate in the conduit. The program code (27) can further include a flow sensor analog to digital converter (44) which converts the analog signal from the flow sensor (21) to a digital signal which can be processed by a water flow calculator (35) which functions to calculate the water flow rate generated by the water pump (19) (gallons per minute or other units of flow rate).

Again, with primary reference to FIG. 2, in particular embodiments, based on the assessment by the valve V3 position analyzer (36) the program code (27) can further function to operate the proportional valve V3 (20) valve V3 actuator (42) to adjust the position set point of the proportional valve V3 (20) to deliver the target water flow rate calculated by the water flow calculator (35). The program code (27) may only function to change the set point of the proportional valve V3 (20) when the target water flowrate changes. The water flowrate can be further modulated by adjustment of water pump speed based on the PID loop to precisely satisfy the target water flowrate. Modulation of the water flowrate, using the PID loop addresses two concerns. First, the water flow calibration table (31) created by the water flow rate calibration table generator (34) based on recorded water flow rate at each one of the proportional valve V3 (20) position set points, includes extrapolated water flow values between valve set points, which may not afford a precise water flow calibration between valve V3 (20) position set points. The PID loop can further actuate the hydraulic fluid flow controller (37) to control the flow of hydraulic fluid flow to water pump (16) to control to the speed of the water pump (16) to adjust water flow pressure based on calculated fluid pressure. This use of the PID loop in conjunction with a fixed set point of the proportional valve V3 (20) can afford greater resolution in adjustment of water flow rate as compared to only directly adjusting the proportional water valve V3 (20). Secondly, as components in the moisture control apparatus (8) start to wear and perform differently, the PID loop can compensate for this wear until a new water flow calibration table (31) can be created.

Embodiments can further include a water flow rate adjustor (43) which operates to increase water flow rate, but is not included in the target water flowrate calculation when production rate is changed. If the target water flowrate is calculated at 10 GPM and the operator uses the water flowrate adjustor (43) to increase water flowrate to 11 GPM, then if the operator doubles the production rate, the new water flowrate is 21 GPM ((10 gpm target GPM)×2+1 GPM).

Particular embodiments of the program code (27) can further include a graphical user interface generator (46). The graphical user interface generator (46) can function to depict a graphical user interface (47) on a display surface (48) of an operator panel (49). A "click event" occurs when an operator (50) operates an application function through the use of a command which for example can include as illustrative examples: a touch on the display surface (48) or pressing or releasing the left mouse button while a pointer is located over a control icon (or other interactive field which activates a function of the program code (27) displayed in the graphic user interface (47). However, it is not intended that a "click event" be limited to a touch on the display surface or the press and release of the left button on a mouse while a pointer is located over a control icon (or field), rather, a "click event" is intend to broadly encompass a command by the operator (50) through which a function of program code (27) can be activated or performed, whether through selection of one or a plurality of control icon(s), entry of data into displayed fields, or by user voice command, keyboard stroke, mouse button, touch on a touch screen, or otherwise. The graphic user interface (47) can be implemented using various technologies and different devices, depending on the preferences of the designer and the particular efficiencies desired for a given circumstance.

By click event the operator (50) can enter commands which depict menus (45) on the display surface (48) in which the operator (50) can enter data to create and record concrete mix recipes (29), concrete material calibration tables (30), waterflow calibration tables (31), and production rate settings (32). Similarly, by click event the operator (50) can actuate the program code (27) to depict menus on the display surface (48) for selection of concrete recipes (29) and production rate settings (32) which can be further processed by the computer code (27) to actuate material holding bins (2) to calibrated gate openings and actuate valve V1 (12), valve V2 (17) and adjust the proportional valve V3 (20) based on the selected concrete mix recipe (29) and production rate setting (32) in view of the applied concrete material calibration table (30) and the applied waterflow calibration table (31) to dispense materials (6) and water (10) which are admixed for the production of concrete (7).

As can be easily understood from the foregoing, the basic concepts of the present invention may be embodied in a variety of ways. The invention involves numerous and varied embodiments of a moisture control apparatus and methods for making and using such moisture control apparatus including the best mode.

As such, the particular embodiments or elements of the invention disclosed by the description or shown in the figures or tables accompanying this application are not intended to be limiting, but rather illustrative of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "calculator" should be understood to encompass disclosure of the act of "calculating"—whether explicitly discussed or not—and, conversely, were there effectively disclosure of the act of "calculating", such a disclosure should be understood to encompass disclosure of a "calculator" and even a "means for calculating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in Merriam-Webster's Collegiate Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the material mixing systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A concrete moisture control system, comprising:

a hydraulic water pump which generates a water flow in a conduit;

a proportional control valve configured to operate between a closed condition and an open condition;

a controller operable to:

retrieve a concrete mix recipe from a database, said concrete mix recipe defines relative proportion of materials to be dispensed from a plurality of bins;

retrieve from said database a production rate table which defines an amount of materials to be dispensed per unit time from said plurality of bins;

operate a water flow calculator to calculate a target water flow rate based on said amount of materials dispensed per unit time from said plurality of bins;

retrieve from said database a water flow calibration table which correlates each of a plurality of proportional control valve positions between said closed condition and said open condition to each of a plurality of water flow rates through said proportional control valve;

retrieve a pressure signal from a pressure sensor fluidically coupled to said water flow in said conduit;

operate a fluid pressure calculator to calculate fluid pressure in said conduit;

operate a hydraulic fluid flow calculator to calculate hydraulic fluid flow to said hydraulic water pump based on said fluid pressure in said conduit and actuate said proportional control valve based on said water flow calibration table, and actuate a hydraulic fluid flow controller to regulate speed of said water pump based on the calculated hydraulic fluid flow, wherein actuation of said proportional control valve and regulation of said speed of said water pump maintains said target water flow rate to said amount of materials dispensed from said plurality of bins.

2. The system of claim 1, wherein said controller further operable to retrieve a concrete materials calibration table from said database, said concrete calibration table defines bin gate openings to deliver said amount of materials dispensed per unit time from each of said plurality of bins.

3. The system of claim 2, wherein said controller further operable to adjust said bin gate openings to deliver said amount of materials dispensed per unit time from each of said plurality of bins.

4. The system of claim 3, wherein said controller further operable to operate a material conveyor to convey said amount of materials dispensed per unit time from each of said plurality of bins toward a materials mixer.

5. The system of claim 1, further comprising a hydraulic fluid flow standby fluid pressure regulator operable to maintains a standby fluid pressure in said conduit.

6. The system of claim 1, wherein said controller further operable to depict a graphical user interface on a display surface of an operator panel.

7. The system of claim 6, wherein said graphical user interface allows entry of operator indications to select said concrete recipe or said production rate table to be retrieved by said controller.

8. The system of claim 6, wherein said graphical user interface allows entry of operator indications to enter into said database one or more of: said concrete mix recipes, said concrete material calibration tables, said waterflow calibration tables, and said production rate table.

* * * * *